United States Patent [19]

Kohno et al.

[11] 4,058,093
[45] Nov. 15, 1977

[54] CARBURETOR FOR USE IN INTERNAL COMBUSTION ENGINE

[75] Inventors: Takashige Kohno, Hitachi; Takeshi Takamaru, Mito; Akiyasu Kuwahara, Hitachi; Michitsugu Mori, Katsuta, all of Japan

[73] Assignee: Hitachi, Ltd., Japan

[21] Appl. No.: 588,365

[22] Filed: June 19, 1975

[30] Foreign Application Priority Data

June 21, 1974 Japan ............................ 49-70190

[51] Int. Cl.$^2$ ...................... F02B 19/10; F02B 19/16; F02B 19/18
[52] U.S. Cl. ......................... 123/75 B; 123/37 ST; 123/127; 261/41 R
[58] Field of Search ............... 123/127, 32 ST, 75 B; 261/41 R, 41 A, 41 B, 41 C, 41 D, 43, 45, 54

[56] References Cited

U.S. PATENT DOCUMENTS 3,842,810  10/1974  Yagi et al. .................. 123/127 X Primary Examiner—Wendell E. Burns
Attorney, Agent, or Firm—Craig & Antonelli

[57] ABSTRACT

A carburetor for use in an internal combustion engine wherein a rotary throttle valve provided therethrough in the radial direction of the rotary shaft with a gasified fuel-air mixture passageway is provided in an air supply duct of the carburetor and the flow of mixtures of gasified fuel and air that is supplied into the engine can be controlled by the rotation of said rotary throttle valve, while said rotary throttle valve stays at a low opening degree, a bypass passageway forking from the intermediate portion of a low speed fuel passageway is made open to said gasified fuel-air mixture passageway and at the same time the upstream portion of the air supply duct of said rotary throttle valve and said gasified fuel-air mixture passageway can be communicated through an air passageway and while said rotary throttle valve is moved from the position "close" toward "open," predetermined interrelations are given to the opening positions or the sizes of port diameters of said gasified fuel-air mixture passageway, of said air passageway and of said bypass passageway, so that the flow of the mixtures of gasified fuel and air can be smoothly increased from a lower speed to a higher speed.

4 Claims, 3 Drawing Figures

— MIXTURE PASSAGEWAY
---- BYPASS PASSAGEWAY

NEGATIVE PRESSURE

OPENING AREA

OPENING DEGREE OF THROTTLE VALVE

CARBURETOR FOR USE IN INTERNAL COMBUSTION ENGINE

BACKGROUND OF THE INVENTION

The present invention relates to a carburetor for supplying mixtures of gasified fuel and air into an internal combustion engine, and more particularly to a carburetor for use in a so-called torch-ignition type internal combustion engine comprising a main combustion chamber and an auxiliary combustion chamber maintained in communication with said main combustion chamber through a small port.

In general, the torch-ignition type internal combustion engine comprises a main combustion chamber to which a lean mixture of gasified fuel and air is supplied and an auxiliary combustion chamber maintained in communication with said main combustion chamber through the small port and to which a rich mixture of gasified fuel and air is supplied. The flames of combustion created in the auxiliary combustion chamber by igniting the rich mixture of gasified fuel and air supplied into the auxiliary combustion chamber, in turn ignite the lean mixture of gasified fuel and air which is supplied into the main combustion chamber, thereby integrally operating the engine by using the lean mixture of gasified fuel and air.

With a view to the improvements of the fuel consumption rate and the decrease of nitrogen oxide and the like in quantities in the construction of the torch-ignition type internal combustion engine, the volume of auxiliary combustion chamber may be preferably smaller than that of main combustion chamber, and for example, the volume of auxiliary combustion chamber is practicable to be at 3 to 4% of that of main combustion chamber.

A carburetor for supplying mixtures of gasified fuel and air into the torch-ignition type internal combustion engine of the type described must accurately control the flow of mixtures of gasified fuel and air to be supplied. Particularly, an accurate control is required for a throttle valve of the auxiliary carburetor supplying the rich mixture of gasified fuel and air into the auxiliary combustion chamber having an extremely small volume as compared with that of main combustion chamber, as described above.

There have heretofore been used butterfly valves as the throttle valves in carburetors in general. In case that a butterfly valve of the type described is used in the auxiliary carbureter supplying an extremely small quantity of mixture of gasified fuel and air into the auxiliary combustion chamber of the torch-ignition type internal combustion engine, the mixture of gasified fuel and air is greatly affected by air leakage around the periphery of the valve. Thus, the butterfly valve is not suitable as the throttle valve for the carburetor used in the auxiliary combustion chamber of the torch-ignition type internal combustion engine.

In this respect, there has recently been proposed a carburetor in which the air leakage around the periphery of a valve is minimized by a provision of a rotary throttle valve provided therethrough in the radial direction of the rotary shaft with a gasified fuel-air mixture passageway, thereby permitting the accurate control of the flow of mixtures of gasified fuel and air.

However, with a view to construction, a low speed bypass mechanism of the carburetor having a butterfly valve cannot be utilized in the aforesaid carburetor having a rotary throttle valve. Thus, a characteristic for feeding combined fuels from a low speed fuel system and a main fuel system is not favorable, so that there occurs a phenomenon in which the flow rate of fuel is not smoothly increased and the mixture becomes lean in a transient operating condition of the internal combustion engine in which the main fuel system starts to operate. In other words, a combined fuels feeding characteristics is favorably carried out in the carbureter using the butterfly valve, because the low speed bypass mechanism operates in accordance with an opening of the butterfly valve, but, in the case of a rotary throttle valve, the conventional bypass mechanism does not operate, even if the rotary throttle valve is open, thus resulting in an unfavorable combined fuel feeding characteristics. As the result, an ignition plug provided in the auxiliary combustion chamber fails to ignite the mixture of gasified fuel and air in the auxiliary combustion chamber, which in turn leads to any failure in igniting the mixture of gasified fuel and air in the main combustion chamber. Thus, such problems are presented that favorable rotation of the engine cannot be obtained, and unburnt combustible components of carbon monoxide, hydrocarbon and the like increase which are contained in exhaust gases.

SUMMARY OF THE INVENTION

It is an object of the present invention to provide a carburetor which can obtain a favorable rotation of the engine by successively increasing the mixtures of gasified fuel and air in quantities and which can control any generation of unburnt combustible components in exhaust gases in the course of changing from the low speed fuel system to the main fuel system.

CHARACTERISTICS OF THE INVENTION

The carburetor produced according to the present invention wherein, while a rotary throttle valve disposed in an air supply duct of the carburetor stays at a low opening degree, a bypass passageway diverging from the intermediate portion of a low speed fuel passageway is made open to a gasified fuel-air mixture passageway provided in the rotary throttle valve and at the same time said gasified fuel-air mixture passageway is communicated with the air supply duct at the upstream of the rotary throttle valve through an air passageway, is characterized in that, while the rotary throttle valve is moved from the position "close" to "open," predetermined interrelations are given to the opening positions or the sizes of port diameters of said gasified fuel-air mixture passageway, of said air passageway and of said bypass passageway, so that the flow of the mixtures of gasified fuel and air can be successively increased in the course of changing from the low speed fuel system to the main fuel system.

DETAILED DESCRIPTION OF THE PREFERRED EMBODIMENT

Detailed description will hereunder be given on the carburetor produced according to the present invention with reference to the accompanying drawings.

Figure 1:
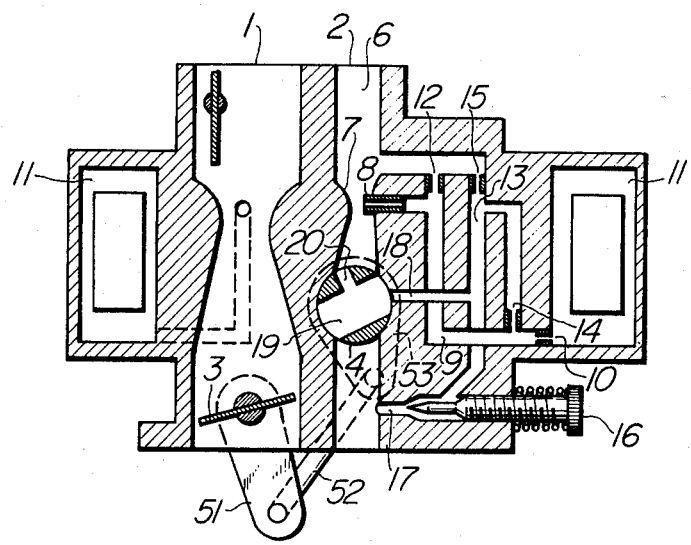
FIG. 1 is a cross-sectional view of a carburetor comprising one embodiment of the present invention.

Referring now to FIG. 1, 1 designates a carburetor for use in a main combustion chamber (hereinafter referred to be as "a main carburetor") for supplying a lean mixture of gasified fuel and air to the main combustion chamber.

2 is a carburetor for use in an auxiliary combustion chamber (hereinafter referred to be as "an auxiliary carburetor") for supplying a rich mixture of gasified fuel and air to the auxiliary combustion chamber.

3 is a main throttle valve provided in the main carburetor and which is operationally connected to a rotary throttle valve 4, an auxiliary throttle valve, which is provided in the auxiliary carburetor 2 by way of a lever 51, a rod 52 and a lever 53. 6 is an air supply duct for the auxiliary carburetor and formed in the intermediate portion thereof with a Venturi flume 7. 8 is a main fuel nozzle of the auxiliary carburetor 2 and maintained in communication with a float chamber 11 through a main fuel passageway 9 and a main fuel jet 10. 12 is an air bleeder provided in the main fuel passageway 9 for promoting atomization of the fuel flowing through the main fuel passageway 9. 13 is a low speed fuel passageway and maintained in communication with the float chamber 11 through a low speed fuel jet 14. 15 is a low speed air bleeder for promoting atomization of the fuel flowing through the low speed fuel passageway 13. 16 is an idle adjustment screw provided in the auxiliary carburetor 2 for adjusting the idle fuel ejected through an idle port 17. 18 is a bypass passageway diverging from the middle portion of the low speed fuel passageway 13 and arranged to be opened to the gasified fuel-air mixture passageway 19 provided in the rotary throttle valve 4 while the rotary throttle valve 4 stays at the low opening degree.

20 is an air passageway opened to the gasified fuel-air mixture passageway 19 provided in the rotary throttle 4 and intercommunicates between the gasified fuel-air mixture passageway 19 and the air supply duct 6 while the rotary throttle valve 4 stays at the low opening degree.

Next, the operation will be described with reference to the above arrangement.

At the time of starting the engine, a choke valve provided in the main carburetor 1 is closed and a supply of fuel for starting is supplied through the idle port (not shown) provided in the main carburetor 1. At this time, the main throttle valve 3 is maintained at an opening degree of "first idle." Additionally, having been operationally associated with this by way of the levers 51, 53 and rod 52, the rotary throttle valve 4 of the auxiliary carburetor 2 is set at the opening degree suitable for starting. As the opening degree of the rotary throttle valve 4 is low, the quantity of air flowing through the auxiliary Venturi flume 7 is small and no fuel flows out of the main fuel nozzle 8. On the other hand, as the negative pressure for suction in the engine is high, the fuel required for the idling operation of the engine is supplied from the auxiliary idle port 17. At this time, the air passageway 20 and the gasified fuel-air mixture passageway 19 which are provided in the rotary throttle valve 4 are communicated with the low speed fuel passageway 13. As a result, a supply of air for correction is supplied through the air supply duct 6, the air passageway 20, the gasified fuel-air mixture passageway 19 and the bypass passageway 18 into the idle port 17 to correct the air fuel ratio of the low speed fuel.

Next, as the rotary throttle valve 4 is rotated to cause the gasified fuel-air mixture passageway 19 to be opened at the downstream of the rotary throttle valve 4, the opening area of the bypass passageway 18 becomes gradually smaller with rotation of the rotary throttle valve 4. As the result, the negative pressure imposed on the interior of the auxiliary low speed passageway 13 is increased, the flow of the fuel ejected through the auxiliary idle port 17 is increased and the flow of the fuel from the low speed fuel system is increased in accordance with opening degrees of the rotary throttle valve 4, thereby permitting to obtain favorable characteristics in the fuel flow. At this time, the air passageway 20 opened to the gasified fuel-air mixture passageway 19 of the rotary throttle valve 4 is fully opened at the upstream of the rotary throttle valve 4. Accordingly, the change in pressure within the gasified fuel-air mixture passage 19 is small up to a certain opening degree and does not interfere with the bypass passageway 18.

If the rotary throttle valve 4 is further rotated to be opened from the above opening degree, the opening area of the air passageway 20 opened at the upstream of the rotary throttle valve 4 becomes smaller and the negative pressure at the downstream of the rotary throttle valve 4 comes to act on the gasified fuel-air mixture passageway 19. At the result, the low speed fuel passes from the auxiliary low speed fuel passageway 13 through the bypass passageway 18 and ejected into the gasified fuel-air mixture passageway 19, and as the flow of fuel is increased in quantities with the increase of the quantity of air at the time of switching from the low speed fuel system to the main fuel system, thereby preventing the mixture of gasified fuel and air from becoming lean.

Figure 2:
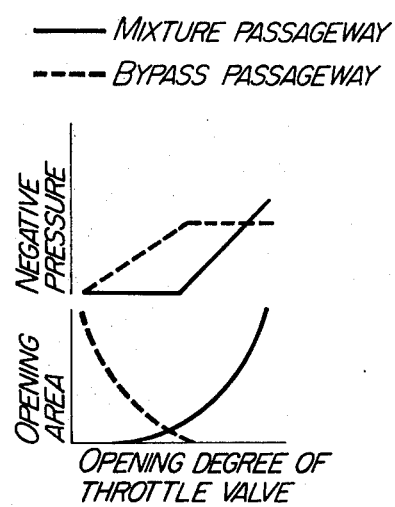
FIG. 2 is a drawing showing the characteristics of the opening degrees and the negative pressures of the carburetor produced according to the present invention.

Next, description will be given on the characteristics of the carburetor produced according to the present invention in interrelations between the opening degrees of the rotary throttle valve and the bypass passageway 18 and between the opening areas, the negative pressure of the gasified fuel-air mixture passageway 19 and the negative pressure of the low speed fuel passageway 13, with reference to FIG. 2.

First, when the opening degree of the rotary throttle valve 4 is low, the opening area of the bypass passageway 18 is large, but conversely, the opening area of the gasified fuel-air mixture passageway 19 opened at the downstream of the rotary throttle 4 is small. Accordingly, the negative pressure imposed on the low speed fuel passageway 13 through the gasified fuel-air mixture passageway 19 and the bypass passageway 18 is small.

Next, while the rotary throttle valve 4 is gradually opened, the opening area of the bypass passageway 18 becomes smaller, but conversely, the opening area of the gasified fuel-air mixture passageway 19 opened at the downstream of the rotary throttle valve becomes larger, with which the negative pressure imposed on the low speed fuel passageway 13 becomes higher. However, the negative pressure imposed on the gasified fuel-air mixture passageway 19 does not become higher, because the air passageway 20 is fully open at the upstream of the rotary throttle valve. When the rotary throttle valve 4 reaches the predetermined opening degree, the negative pressure imposed on the low speed fuel passageway 13 through the bypass passageway 18 becomes substantially constant, but conversely, the gasified fuel-air mixture passageway 19 comes to be affected by the pressure at the downstream of the rotary throttle valve 4 and is increased in the negative pressure thereof. As the result, the switching from the low speed fuel system to the main fuel system is carried out smoothly.

Next, description will be given on another embodiment of the present invention with reference to FIG. 3.

Figure 3:
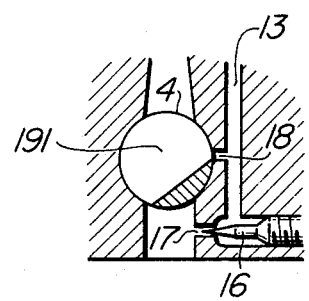
FIG. 3 is a cross-sectional view of the essential portions of the carburetor comprising another embodiment of the present invention.

The carburetor shown in FIG. 3 dispenses with the air passageway shown in FIG. 1, and the gasified fuel-air mixture passageway 191 is fully open into the air supply duct even when the opening degree of the rotary throttle valve 4 is still low.

By designing the rotary throttle valve 4 as described, it is possible to cause the fuel to be ejected from the bypass passageway 18 in the course of opening of the rotary throttle valve 4 from a low opening degree to the steady opening degree, thereby permitting to obtain favorable fuel characteristics.

As having been described above, by the use of the carburetor having the rotary throttle valve according to the present invention, it is possible to protect the mixture of gasified fuel and air from becoming lean during the period of switching from the low speed operation to the steady operation, so that a favorable rotation of the engine can be obtained, and moreover, any generation of unburnt combustible components in exhaust gases can be prevented.

What is claimed is:

1. A carburetor for use in an internal combustion engine, said carburetor comprising
    an air supply duct, a main fuel passageway, and a low speed fuel passageway;
    a rotary throttle valve mounted in said air supply duct, said rotary throttle valve having a body portion with a gasified fuel-air passageway extending radially through the body portion for passing gasified fuel-air mixtures, and said rotary throttle valve controlling the amount of flow of the gasified fuel-air mixtures supplied to the engine by rotation of said rotary throttle valve; and
    a bypass passageway extending from the low speed fuel passageway to an opening port adjacent said rotary throttle valve, said opening port being disposed to communicate with said gasified fuel-air passageway of said rotary throttle valve when said rotary throttle valve is at idling opening position, and said opening port being continuously closed by said body portion upon said rotary throttle valve being rotated from its idling opening position to a predetermined operational opening of said rotary throttle valve so that said opening port is closed at said predetermined operational opening.

2. A carburetor according to claim 1, wherein said rotary throttle valve is further provided with an air passageway in said body portion for communicating said air supply duct with said gasified fuel-air passageway, said air passageway being disposed to decrease the communication between said air supply duct and said gasified fuel-air passageway during rotation of said rotary throttle valve.

3. In a torch nozzle type internal combustion engine having a main combustion chamber and an auxiliary conbustion chamber associated with each cylinder of said engine, a carburetor for supplying a lean fuel-air mixture to said main combustion chamber by means of at least one main air supply duct and a rich fuel-air mixture to said auxiliary combustion chamber by means of an auxiliary air supply duct, said carburetor including a main fuel supply duct and a low speed fuel supply duct, wherein the improvement comprises means associated with said auxiliary air supply duct for providing a variable air bleeder to continuously control the amount and composition of said rich fuel-air mixture during changes from idling to normal operation of said engine, wherein said variable air-bleeder means comprises in combination
    valve means mounted for rotation in said auxiliary air supply duct for controlling the amount and composition of the fuel-air mixture, said valve means including a body portion mounted for rotation in said auxiliary air supply duct and at least one passageway extending radially through said body portion for passing the fuel-air mixture; and
    bypass passageway means for communicating the low speed fuel supply duct with said auxiliary air supply duct adjacent said valve means, said bypass means having an opening port disposed to be in communication with said one passageway in said valve means at the engine idling position of said valve means, and
    wherein said opening port is continuously decreased in opening area upon rotation of said valve means from said idling position to a predetermined open position of said valve means.

4. A carburetor according to claim 3, wherein said valve means includes a second passageway for communicating said auxiliary air supply duct with said one passageway, said second passageway being disposed to decrease the communication through said second passageway between said auxiliary air supply duct and said one passageway upon rotation of said valve means from said idling position.

* * * * *